US012582040B2

(12) United States Patent
Kormann

(10) Patent No.: US 12,582,040 B2
(45) Date of Patent: Mar. 24, 2026

(54) METHOD AND APPARATUS FOR MEASURING CROP THROUGHPUT

(71) Applicant: DEERE & COMPANY, Moline, IL (US)

(72) Inventor: Georg A. Kormann, Zweibruecken (DE)

(73) Assignee: Deere & Company, Moline, IL (US)

( * ) Notice: Subject to any disclaimer, the term of this patent is extended or adjusted under 35 U.S.C. 154(b) by 919 days.

(21) Appl. No.: 17/656,810

(22) Filed: Mar. 28, 2022

(65) Prior Publication Data

US 2022/0304232 A1 Sep. 29, 2022

(30) Foreign Application Priority Data

Mar. 29, 2021 (DE) .......................... 102021107874.1

(51) Int. Cl.
*A01D 43/08* (2006.01)

(52) U.S. Cl.
CPC .................................. *A01D 43/085* (2013.01)

(58) Field of Classification Search
CPC .... A01D 43/85; A01D 43/08; A01D 43/1271; A01D 43/1272; A01D 43/1274
See application file for complete search history.

(56) References Cited

U.S. PATENT DOCUMENTS

| | | | | |
|---|---|---|---|---|
| 5,325,656 A | * | 7/1994 | Schreiner | A01D 46/14 56/10.2 H |
| 2005/0066738 A1 | * | 3/2005 | Moore | A01D 41/127 73/760 |

| | | | | |
|---|---|---|---|---|
| 2005/0279073 A1 | * | 12/2005 | Clauss | A01D 69/06 56/364 |
| 2010/0110428 A1 | * | 5/2010 | Priesnitz | G01J 3/02 56/10.1 |
| 2017/0251600 A1 | * | 9/2017 | Anderson | A01D 41/1272 |
| 2020/0196531 A1 | * | 6/2020 | Hermann | A01F 12/32 |
| 2020/0337235 A1 | * | 10/2020 | Blank | A01M 21/043 |
| 2021/0394622 A1 | * | 12/2021 | Gaither | B60Q 9/00 |

FOREIGN PATENT DOCUMENTS

| | | | | |
|---|---|---|---|---|
| CN | 102589628 B | * | 9/2016 | .............. G01F 1/74 |
| DE | 19524752 A1 | | 1/1997 | |
| DE | 102010043854 A1 | | 5/2012 | |

(Continued)

OTHER PUBLICATIONS

Jones et al., "From Harvest to Feed: Understanding Silage Management" Sep. 4, 2017, PennState Extension, pp. 21 (Year: 2017).*

(Continued)

*Primary Examiner* — Erin M Piateski
*Assistant Examiner* — Ashley Tiffany Schoech
(74) *Attorney, Agent, or Firm* — HANLEY, FLIGHT & ZIMMERMAN, LLC

(57) ABSTRACT

A method and an apparatus for determining a throughput of a harvesting machine. More specifically, a harvesting machine having a throughput sensor and an electronic control device, the throughput sensor calibrated on part of a field with a crop stand of constant density to consider the influence of the rate of advancement and the rate of conveyance of the harvesting machine on the signal of the throughput sensor.

20 Claims, 2 Drawing Sheets

(56)                    References Cited

FOREIGN PATENT DOCUMENTS

| | | | | | |
|---|---|---|---|---|---|
| DE | 102018213215 | A1 | | 2/2020 | |
| EP | 1053671 | A1 | * | 11/2000 | ......... A01D 41/1277 |
| EP | 1266558 | A2 | | 12/2002 | |
| EP | 1327384 | A1 | | 7/2003 | |
| EP | 1023826 | B1 | * | 9/2003 | ........... A01D 43/085 |
| EP | 1738634 | A1 | | 1/2007 | |
| EP | 2266383 | A1 | | 12/2010 | |
| EP | 2764764 | A1 | | 8/2014 | |
| EP | 2974587 | A1 | * | 1/2016 | ......... A01D 41/1271 |
| SU | 1395955 | A1 | | 5/1988 | |

OTHER PUBLICATIONS

Ehlert, "Advanced Throughput Measurement in Forage Harvesters" 2002, Biosystems Engineering, v. 83, pp. 47-49 (Year: 2002).*

Neil Barnett et al., Analysis of systems to measure mass-flow-rate and moisture on a forage harvester, 1998 ASAE International Meeting, dated Jul. 11-16, 1998, pp. 1-25.

D. Ehlert et al., Advanced throughput measurement in forage harvesters, Biosystem Engineering 2002, 83, dated May 23, 2002, pp. 47-53.

Auernhammer et al., "Yield Measurement on Self Propelled Forage Harvesters," ASAE Meeting Presentation, No. 951757, Jun. 19-23, 1995, 10 pages.

Martel et al., "Sensors to measure mass-flow-rate through a forage harvester," Canadian Agricultural Engineering, vol. 42, No. 3, Jul./Aug./Sep. 2000, 7 pages.

* cited by examiner

METHOD AND APPARATUS FOR MEASURING CROP THROUGHPUT

RELATED APPLICATIONS

This document claims priority based on German Patent Application No. 102021107874.1, filed on Mar. 29, 2021, which is hereby incorporated by reference into this application.

DESCRIPTION

The disclosure relates to a method and an arrangement for determining a throughput of a harvesting machine.

BACKGROUND

Forage harvesters are used to harvest whole plants or parts thereof, which, during operation, are picked up from a field with a harvesting attachment, are compacted by precompacting rollers and are fed to a blade drum, the chopping blades of which chop up the plants in cooperation with a counter-blade. Subsequently, the chopped-up plants or plant parts are optionally fed to a conditioning roller assembly and conveyed by a post-accelerator into a deflector, which transfers them onto a transport vehicle. The harvested plants are generally used as cattle fodder or for biogas production.

SUMMARY

A method comprising: identifying a crop stand with a constant density in a field; harvesting the identified crop stand with a harvesting machine traveling at a first rate of advancement and a second rate of advancement; measuring the throughput of the crop with a sensor interacting with the crop passing through the harvesting machine at a first rate of conveyance and a second rate of conveyance; determining a correction value for the throughput measured with the sensor based on the throughputs of at least one of the first and second rate of advancement and the first and second rate of conveyance; and applying the correction value in subsequent measurements of the throughput by the sensor during the harvesting operation in the field.

An apparatus comprising: a harvesting machine configured to operate at first and second rates of advancement; a sensor associated with the harvesting machine and configured to measure throughput of the crop passing through the harvesting machine at first and second rates of conveyance; and an electronic control device configured to identify a crop stand with a constant density in a field and receive a signal from the sensor, the electronic control unit further determining a correction value for the throughput measured with the sensor based on at least one of the first and second rate of advancement and the first and second rate of conveyance and applying the correction value in subsequent measurements of the throughput by the sensor during operation of the harvesting machine in the field.

DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
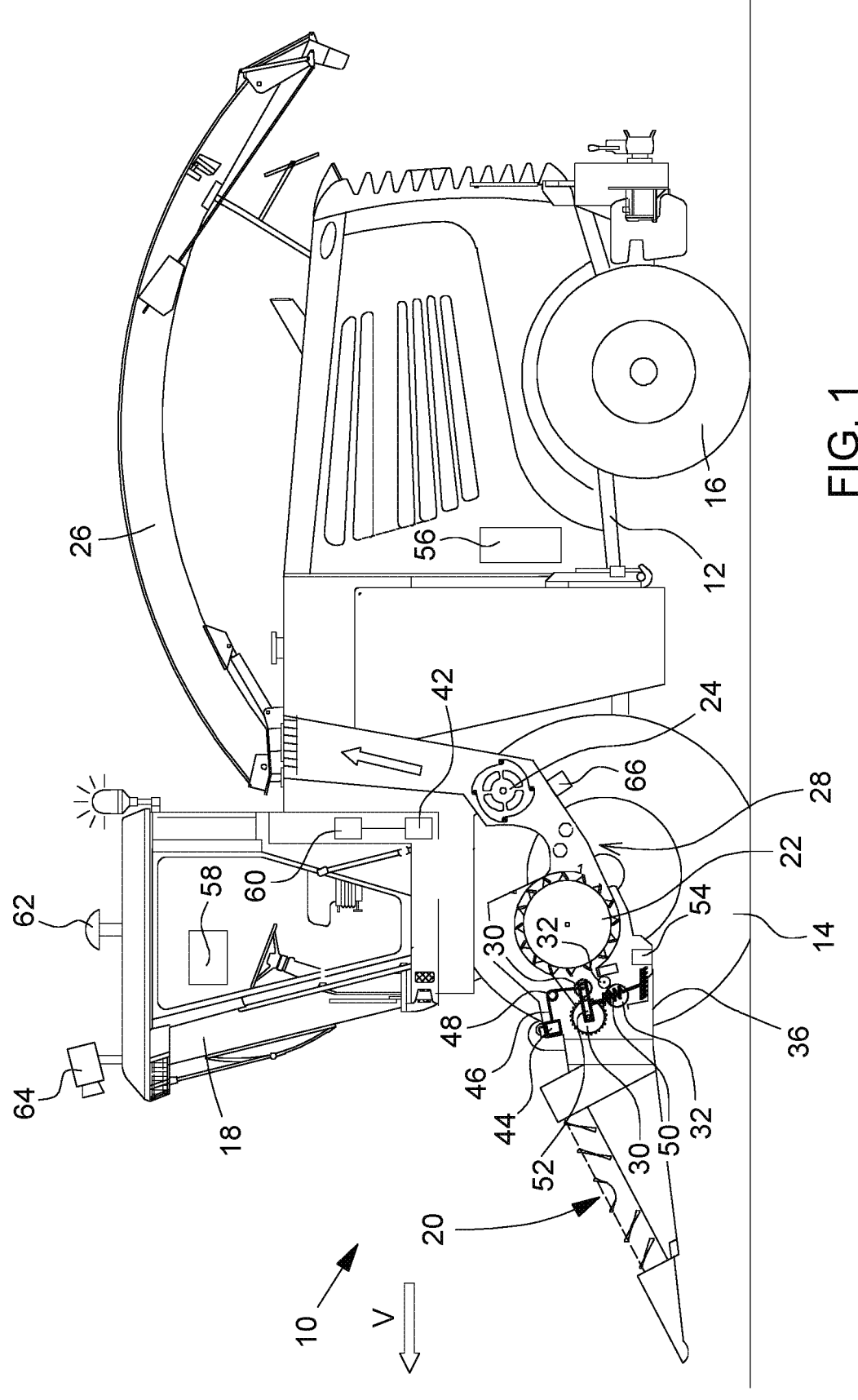
FIG. 1 shows a forage harvester in a schematic side view.

In order to determine the crop throughput picked up and processed by the forage harvester, arrangements for determining the throughput will be described. There are various approaches to this, one of which is determining the position of an upper precompacting roller, which is upwardly movable against the force of a spring (see German Patent No. DE 195 24 752 A1). With increasing throughput, the upper precompacting roller moves upwards and the volume flow, i.e., the volume of the crop that is picked up per unit of time by the forage harvester, is measured based on the position and the rotational speed of the upper precompacting roller.

For various purposes, including for yield mapping, for mass-related adding of an ensiling agent or for controlling a transfer operation (in order to load the transport vehicle with a predetermined mass of crop), there is an interest in determining the mass flow, i.e., the mass (in kg) of the crop that is picked up per unit of time. Information concerning the density of the crop would consequently be required for this but would not been known directly or could not be measured without considerable effort. In some examples, a calibrating factor is usually calculated by an on-board computer based on data obtained during weighing of the crop and the associated volume throughput measured based on the position of the precompacting rollers and is used for calculating the mass throughput (see German Patent Application No. DE 10 2010 043 854 A1).

In the literature there are also other proposals for measuring the mass flow, for example based on radiometric principles (see ASAE Paper No. 951757); capacitive moisture measurement with mass measurement by a baffle plate or weighing of the crop on the transport trailer (see ASAE Paper No. 981118); and/or the same supplemented by light barriers (Canadian Agricultural Engineering Vol. 42, No. 3, 2000, pp. 123).

Another approach is to compact the crop in two successive stages by precompacting rollers and to calculate the moisture content, and ultimately the mass throughput, of the crop by using the pressures and layer thicknesses as well as two empirically determined constants (Soviet Union Patent No. SU 1 395 955 A1). A similar approach, but based on a single compacting stage, can be found in D. Ehlert, Advanced Throughput Measurement in Forage Harvesters, Biosystem Engineering 2002, 83, pp. 47-53. These approaches use several constants which are determined empirically—in field or laboratory trials—and represent certain mechanical properties of the crop (in particular the dependence of the compactability on the pressure and on the moisture content), in order to determine the mass throughput based on the position of the precompacting rollers. Relationships between the position of the precompacting roller and the spring force acting are also included in the equation that is used in the end for determining the mass throughput. The mechanical properties of the crop depend however on the type of plants harvested, on the moisture they contain and their degree of ripeness, while the springs also do not necessarily have linear force characteristics, and so the properties encountered in a field may however differ in practice considerably from the properties of the crop that were previously determined, whether in a different field or in the laboratory, and the nonlinearities of the springs also lead to errors. In other words, this approach suffers from a lack of accuracy.

European Patent No. EP 2 764 764 A1 describes a self-propelled harvesting machine in which working parameters are automatically set based on a map stored in advance, which concerns for example the throughput to be expected. When harvesting, specific parts of the field where the crop is expected to have homogeneous properties are determined in the map and a sensor is calibrated on these parts of the field, for example in that the harvesting machine travels at a constant speed, and consequently constant throughput, and a grain loss sensor is calibrated with a testing bowl or a throughput sensor on the basis of a different measurement, or a fine setting of the working parameters of the threshing and cleaning device takes place there, based on sensor values or operator inputs.

German Patent No. DE 10 2018 213 215 A1 describes a forage harvester in which an adjustment of the processing gap of a conditioning device takes place in areas of the field with homogeneous crop densities to establish a gap size from which there is no further increase in the conditioning effect, i.e., with which all the grains are already impacted. This gap size is ultimately used in the harvesting operation.

Accordingly, it is desirable in a harvesting machine to comprise a sensor determines a volume flow to make improved determination of a throughput of the crop possible. Provided is a method and arrangement for determining a throughput of a harvesting machine comprises the following steps: (a) identifying a crop stand with an at least approximately constant density in a field; (b) harvesting the identified crop stand by the harvesting machine traveling at a preset rate of advancement; (c) measuring the throughput of the stream of crop during step (b) with a sensor which interacts with the crop passing through the harvesting machine at a preset rate of conveyance; (d) repeating steps (b) and (c) at a different rate of conveyance and/or a different rate of advancement; (e) determining a correction value or correction relationship for the throughput measured with the sensor on the basis of the throughputs measured in steps (c) and (d); and (f) using the correction value or correction relationship determined in step (e) in subsequent measurements of the throughput by the sensor during the harvesting operation in the field.

In other words, it is proposed to determine a correction value or correction relationship for the sensor for determining the throughput of the crop in a harvesting machine in a field in situ based on the crop found there. A crop stand in the field that has an at least approximately constant crop density (i.e. number of plants per surface area, height of the plants, thickness of the stems of the plants and density of the leaves) is identified (for example on the basis of a map, in which the yields determined in previous harvesting operations in the harvest have been entered in units of volume or mass per unit of area, or a user input or a sensor, such as a camera) (step (a)). This identified crop stand is picked up (harvested) with the harvesting machine, which travels at a rate of advancement through the identified crop stand, and the throughput of the crop conveyed or flowing at the rate of conveyance through the harvesting machine is measured with a sensor (steps (b) and (c)). This operation is repeated with at least one other rate of advancement and/or rate of conveyance (step (d)).

Further, and due to the constant crop density according to step (a), steps (b) to (d) are based on a constant amount (mass and/or volume) of the crop per harvested unit of area, a correction value or correction relationship for the sensor which for its part serves in step (f), i.e. in the subsequent harvesting operation, for determining a corrected throughput on the basis of the throughput determined with the sensor, can be calculated on the basis of the at least two measurements in step (e). Since different throughputs are determined by the sensor in the different measurements and the rates of advancement and conveyance are known, with a constant crop density it can be found which relationship exists between the value of the sensor and the throughput, and this relationship is used in the form of the correction value or correction relationship in the subsequent throughput measurement. If, for example, a first measurement of the (volume) throughput $\Delta V1/\Delta t$ takes place at a rate of advancement v1 and a rate of conveyance FG1, and a second measurement of the (volume) throughput $\Delta V2/\Delta t$ takes place at a rate of advancement v2 and a rate of conveyance FG2, and v1=v2 and FG1=0.5*FG2 (or v1=2*v2 and FG1=FG2), theoretically $\Delta V1/\Delta t$ should also be twice $\Delta V2/\Delta t$. A possible deviation from the value 2, which may be caused by nonlinearities of the sensor and/or of the (compression) behavior of the crop, is considered in the form of the correction value determined in this way. If measurements are carried out with more than two values of the rate of advancement and rate of conveyance, then any desired correction relationship (for example an equation, curve, or the like) can also be determined and considered later.

In this way, a relatively accurate measurement of the throughput that is adapted to the crop stand of a field to be harvested is obtained. The determination of the correction factor/correction equation may also take place with the aid of machine learning approaches based on multiple factors/equations.

Steps (a) to (f) can be controlled by an electronic control device, whether fully automatically by electronically determining the crop density in step (a) and activating actuators for presetting the rate of advancement and the rate of conveyance in steps (b) to (d) and the carrying out of the calculations in steps (e) and (f), or partially automatically by using an operator interface for obtaining inputs with regard to the crop density in step (a) and for outputting presettings of the rate of advancement and/or the rate of conveyance in steps (b) and (d), which are set manually by the operator, whereas steps (c), (e) and (f) are in turn carried out automatically by the electronic control device.

The sensor may determine the volume throughput, which can be converted into a mass throughput based on a density value (determined by sensors, for example in a calibrating operation, or input).

The harvesting machine is a forage harvester, in which the sensor determines the distance between precompacting rollers which are pretensioned with respect to one another by a spring and/or a hydraulic cylinder and between which the crop is passed. The present invention may however also be carried out on any other harvesting machines in which the crop picked up by the harvesting machine is made to pass by a throughput sensor at a specific rate of conveyance, for example on a combine harvester with a sensor for determining the position of a lower feeder house roller, which rests on the stream of crop picked up (see European Patent No. EP 1 266 558 A2) or on a crop pick-up, a loading wagon or a bale press in which the sensor detects the—throughput-dependent—position of a hold-down device (European Patent No. EP 1 327 384 A1) or a transverse conveying screw (European Patent No. EP 1 738 634 A1). The sensor may also be a light barrier interacting with the stream of crop or any mechanical element which rests on the stream of crop and the position of which is determined to measure the throughput. The throughput sensor may however also determine a mass throughput, for example in that it determines the drive torque of a conveyor of the crop.

In step (f), the (mass or volume) throughput may be stored in a geo-referenced manner and/or serve for controlling a transfer operation (i.e. for detecting if a different place on the transport vehicle is to be loaded with crop or if it has been completely filled) and/or for controlling the adding of an ensiling agent.

Referring now to FIG. 1, a self-propelled forage harvester 10 is constructed on a frame 12, which is carried by driven front wheels 14 and steerable rear wheels 16. The forage harvester 10 is operated from a driver's cab 18, from which a harvesting attachment 20 suitable for harvesting stalk-like plants is observable. Using the harvesting attachment 20, which in the embodiment shown is a corn header that works in a row-independent manner, material picked up from the ground, for example corn, cereals or the like, is fed by upper precompacting rollers 30 and lower precompacting rollers 32 arranged in a feeder assembly 36 to a chopping drum 22, which chops it into small pieces and dispenses it to a conveying device 24. The material passes from the forage harvester 10 to a trailer traveling alongside via a discharge device 26 which is adjustable in its position. A conditioning roller assembly 28, by which the material to be conveyed is fed tangentially to the conveying device 24, extends between the chopping drum 22 and the conveying device 24. In the following text—unless stated otherwise—directional information such as front, rear, left and right is in relation to the forward direction V of the forage harvester 10, which goes from right to left in FIG. 1.

The forage harvester 10 comprises an electronic control device 42, which is connected to a memory 60, an operator interface 58 with a display and input and a sensor 44, which determines the volume throughput of the crop through the forage harvester. The sensor 44 is mechanically connected by way of a flexible element 46, for example a cable, to the rear upper precompacting roller 30. For this purpose, the flexible element 46 is led over a deflecting roller 48, which however could also be omitted. The upper precompacting rollers 30 are supported at both ends respectively on a link 52, which is downwardly pretensioned by a spring 50. The control device 42 is also connected to a drive 54 of the precompacting rollers 30, 32 and to an actuator system 56 for presetting the rate of advancement v of the forage harvester 10, and a position determining device 62 for receiving signals from satellites of a position determining system such as GPS, Glonass and/or Galileo.

Figure 2:
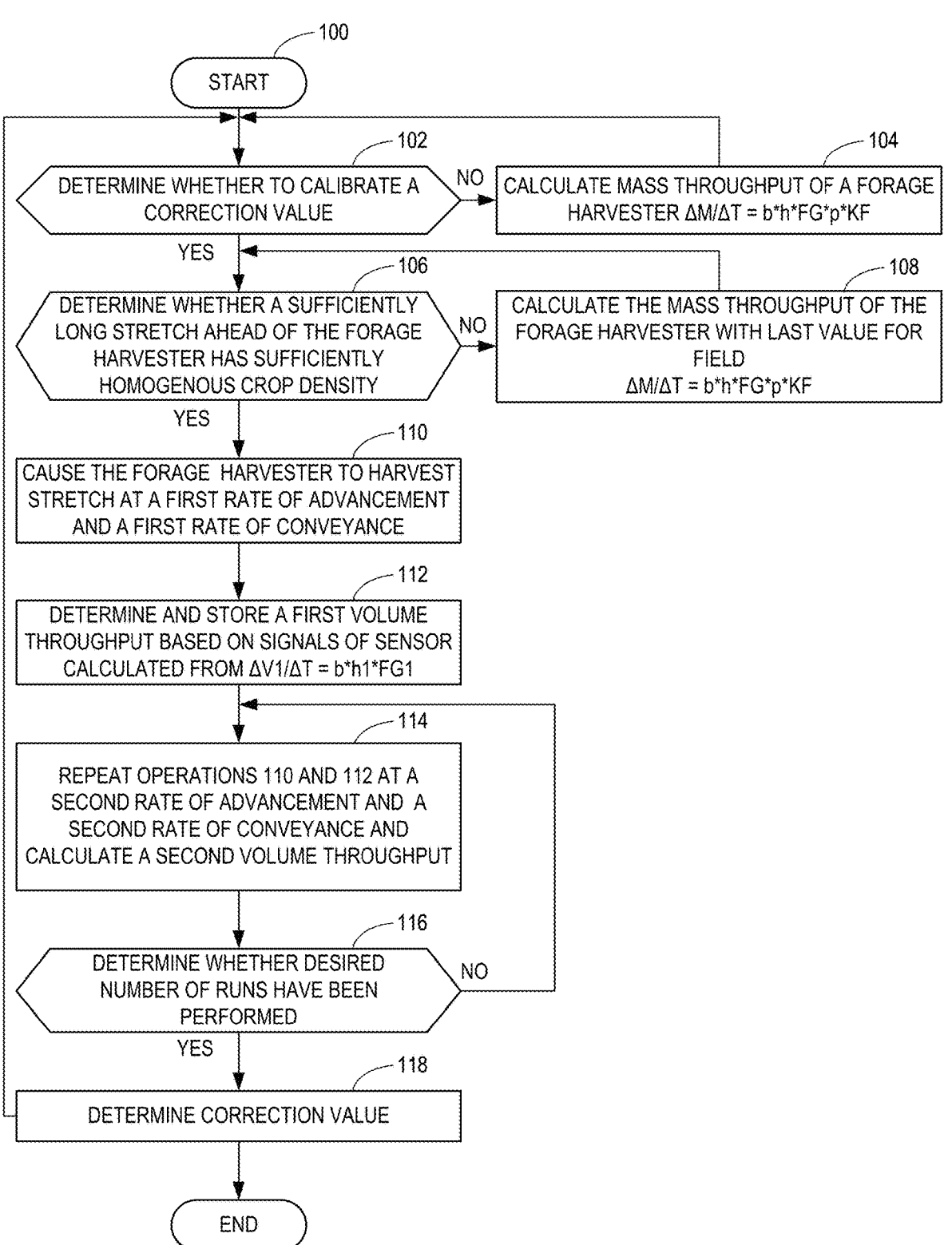
FIG. 2 shows a flow diagram according to which an electronic control unit of the forage harvester works.

Reference is now made to FIG. 2, in which the operation of the electronic control unit 42 during harvesting operation is shown. After the start in step 100 there follows in step 102 an inquiry as to whether a calibration of a correction value (provided here as correction factor KF) is to be carried out, by which the control unit 42 corrects the signals of the sensor 44, which concern the volume throughput of the forage harvester 10 (i.e. the volume of crop picked up per unit of time), in order to compensate for possible nonlinearities of the sensor 44 caused by mechanical properties of the crop, for example its compressibility. The determination of the correction factor KF is discussed further below.

In step 102, a corresponding indication may be given to the operator by way of the operator interface 58 and the operator may input a response. A calibration is generally advisable at the beginning of a harvesting operation, after changing to a different field or part of a field with significantly different properties (type of fruit, degree of ripening and/or wilting, moisture content) of the crop and after the elapse of a specific time period, for example 30 minutes. Consequently, based on an indicated inquiry, the operator can input into the operator interface 58 whether one of these conditions is satisfied. Alternatively or additionally, the control unit 42 may automatically detect at least some of these conditions, for example it may detect on the basis of the signals of the position determining device 62 the beginning of the harvesting operation and the change to a different field, on the basis of a clock the elapse of a time period and on the basis of a lookahead sensor (e.g., camera) 64 directed at the crop stand ahead of the forage harvester 10, and associated image processing software, possible changes in said properties.

If it is found in step 102 that no calibration is to be carried out, step 104 then follows. There, the mass throughput $\Delta m/\Delta t$ of the forage harvester 10 is calculated for example based on the following formula:

$$\Delta m/\Delta t = b*h*FG*p*KF \qquad \text{(equation 1)}$$

where b is the channel width of the crop-guiding part of the feeder assembly 36 (and equal to the axial dimension of the precompacting rollers 30, 32), and is consequently the width of the stream of crop determined by the sensor 44, h is the distance, measured by the sensor 44, between the rear precompacting rollers 30, 32, and consequently the height of the stream of crop determined by the sensor 44, FG is the rate of conveyance of the stream of crop in the feeder assembly 36 preset by the rotational speed of the precompacting rollers 30, 32, p is the mass density of the crop (measurable in kg/m³) and KF is the correction factor for including the properties of the crop in the signal of the sensor 44. The measurement or calibration of the value for p may take place in a way known per se on the basis of a weighing of the crop on the transport vehicle, with a sensor provided there or a stationary balance, and the associated mass throughputs determined on the forage harvester 10, whereas the value for b has been programmed into the memory 60, h is measured by the sensor 44 and the value for FG is known to the control unit 42 on the basis of the control signals passed to the drive 54, or feedback signals determined by its sensors and sent back to the control unit 42. The value for FG together with the rotational speed of the drive motor of the forage harvester 10, and consequently of the chopping drum 22 and the number of blades distributed around the circumference of the chopping drum 22, establishes the respective cut length of the crop. The determination of the correction factor KF is described further below in this document.

The mass throughput determined in step 104 can be mapped by the control device 42 (on the basis of the signals of the position determining device 62) in a geo-referenced manner, for controlling an actuator system (not shown, but see for example European Patent No. EP 2 266 383 A1) for controlling the operation of transferring the crop onto a transport vehicle, i.e. adjust the point of impingement as soon as a specific mass of crop is present there and/or end the transfer operation (by sending a corresponding indication to the operator by way of the operator interface 58 or by automatically changing over the transfer to a different transport vehicle) when a defined total mass has been transferred, and/or for activating a device 66 for adding an ensiling agent. Step 104 is followed again by step 102.

If, on the other hand, it has been found in step 102 that a calibration is to be carried out, it is followed by step 106, in which it is checked whether a sufficiently long stretch ahead of the forage harvester 10 has a sufficiently homogeneous crop density. Step 106 may again take place by an inquiry being indicated by way of the operator interface 58, in that the operator is requested to confirm whether or state that the crop stand has sufficiently homogeneous properties (crop density, type of fruit, degree of ripeness and/or wilting, moisture content) over a sufficiently long stretch, for example 100 m. Alternatively or additionally, it is possible to rely on the signals of the camera 64 in order to detect the homogeneity of the crop stand ahead of the forage harvester 10, and/or the electronic control unit 42 uses a map, prepared in the case of a previous harvesting operation or a different working operation, for example spraying, from the memory device 60 or from a remote server in which information at least concerning the crop density has been entered in a geo-referenced manner. The calibrating operation may also be started automatically, based on remote monitoring information (satellite or drone). Information such as for example biomass growth may be used here. If constant conditions are found over a certain stretch, calibration can be performed in this area. For this purpose, at least two measuring points are approached—it is also possible for more points to be included to be able to compensate for possible nonlinearities.

If it is found in step 106 that the crop stand ahead of the forage harvester 10 does not have an approximately homogeneous density over a sufficiently long stretch, it is followed by step 108. This corresponds to step 104, but the last-used value for the correction factor KF is used in equation (1), or a different suitable value, for example the one determined for the respective field in the case of a previous harvesting operation. Step 108 is again followed by step 106.

If, on the other hand, a sufficiently long, homogeneous crop stand is found in step 106, it is followed by step 110, in which the control device 42 commands the forage harvester 10 to harvest a stretch of the length x1 at a rate of advancement v1 and a rate of conveyance FG1 of the precompacting rollers 30, 32. This commanding may take place by direct presettings being made on the actuator system 56 and on the drive 54, or corresponding instructions are given by way of the operator interface 58 to the operator, who manually sets the corresponding rate of advancement v1 and rate of conveyance FG1 (or associated cut length) and finally confirms this by way of the operator interface 58.

Once a specific time has been allowed to pass, to wait for a stationary state, this is followed by step 112, in which the control device 42 determines and stores the volume throughput based on the signals of the sensor 44. Equation (2) may be used for example for this:

$$\Delta V1/\Delta t = b * h1 * FG1 \qquad \text{(equation 2)}$$

Consequently, the volume throughput $\Delta V1/\Delta t$ is measured in the customary way, in that the width b of the feeder channel is multiplied by its measured height h1 and by the rate of conveyance FG1. Since the measurement takes place over a relatively long time, values of the sensor 44 for h that are measured in this time may be averaged.

This is followed by step 114, in which steps 110 and 112 are repeated, but at a different rate of advancement v2 to vn and/or a different rate of conveyance FG2 to FGn. Step 114 is run through at least once. This consequently delivers at least a second volume throughput $\Delta V2/\Delta t$, for example in accordance with the following equations:

$$\Delta V2/\Delta t = b * h2 * FG2 \qquad \text{(equation 3)}$$

and $$Vn/n/\Delta t = b * hn * FGn \qquad \text{(equation 4)}$$

In the following step 116 it is inquired whether enough runs of steps 110 to 114 have been carried out. The number of runs and/or the respectively covered stretch x1 (to xn) can be established based on the length of the stretch with a homogeneous crop density determined in step 106 (or input by the operator). If it is found in step 116 that the desired number of runs has not yet been reached, it is again followed by step 114 and otherwise by step 118.

After step 116, consequently at least the measured values for two volume throughputs $\Delta Vn/\Delta t$ are available in step 118 (in the memory 60 of the control unit 42). Since it can be assumed that the crop densities (i.e. the volumes and masses of the crop per unit area standing in the field and picked up by the harvesting machine) and the mechanical properties of the crop are the same for all of these measurements (because of step 106), information is available on the basis of the equations (equation 2) to (equation 3) or (equation 4) that allows determination of the correction factor KF, which can compensate for possible nonlinearities (dependent inter alia on mechanical properties of the crop and of the spring 50) in the relationship between the signal of the sensor 44 and the associated throughput. Further measured variables, such as the moisture content of the crop (which can be measured by an NIR sensor), and the density $\rho$ of the crop, may optionally also be measured here and used in the determination of the correction value or correction factor KF.

If for example the forage harvester 10 picks up a crop stand with the mass crop density B (measurable in kg/m$^2$) at a speed vn (in m/s) with a harvesting attachment 20 of the width w, the mass throughput is:

$$\Delta m1/\Delta t = B * w * v1 \qquad \text{(equation 5)},$$

$$\Delta m2/\Delta t = B * w * v2 \qquad \text{(equation 6)},$$

$$\Delta mn/\Delta t = B * w * vn \qquad \text{(equation 7)},$$

whereas the mass throughput can also be calculated since the volume throughput $\Delta V/\Delta t$ of equations (3) to (5) and the density $\rho$:

$$\Delta mn/\Delta t = b * hn * FGn * \rho \qquad \text{(equation 8)},$$

It is evident from the equations (equation 7) and (equation 8) that (under ideal conditions, i.e. proportionality between h and the throughput, not encountered however in reality) the following would have to apply in view of the constant values for B, w and p:

$$h \text{ proportional to } v/FG \qquad \text{(equation 9)}.$$

Since the quotient of v/FG is relevant here, in steps 110 and 114 as many different values as possible should be chosen for v and FG, in the case of which the quotient is different (or identical quotients of v and FG are avoided).

Since the measured values of H, v and FG, a relationship of h and different quotients of v/FG can be determined in step 118, and from it in turn the correction factor to be used in steps 104 and 106. Any mathematical methods may be used for this. For example, the value for h as a function of v/FG may be entered in a table and a slope and an offset determined by averaging (linear function), and these may serve in steps 104 and 106 for determining the correction factor KF (which in this embodiment is determined in steps 104 and 106 dependently on v and FG). However, any relationships and procedures are possible here (for example also self-learning systems, such as neural networks), in which optionally further input parameters apart from v and FG, such as for example the density p and/or the moisture content of the crop, are considered for determining the correction factor KF or a correction value. Thus, the correction value may be a multidimensional characteristic diagram (dependent on v, FG, p and the moisture content of the crop) determined in step 118 and stored in the memory 60, from which the correction value KF for the situation at the time can be taken (read out) in steps 104 and 106.

It should also be noted that the values of the sensor 44 can be supplemented or replaced by a sensor for measuring the drive torque of the conveying device 24 (this would determine the mass throughput) and/or the signals of the camera 64. The relationships between the signals of all the sensors discussed here may also be learned by a self-learning system (for example neural network) and considered in the determination of the throughput.

The procedure described here makes it possible in the end to compensate for the errors occurring due to varying properties of the crop and nonlinearities of the behavior of the crop and of the spring 50 when compacting the crop by the precompacting roller 30, based on the crop to be harvested at the time.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the systems, methods, processes, apparatuses and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the systems, apparatuses, devices, methods and/or processes via the use of block diagrams, schematics, flowcharts, examples and/or functional language. Insofar as such block diagrams, schematics, flowcharts, examples and/or functional language contain one or more functions and/or operations, it will be understood by those within the art that each function and/or operation within such block diagrams, schematics, flowcharts, examples or functional language can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the signal bearing medium used to carry out the distribution. Examples of a signal bearing medium include, but are not limited to, the following: a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components associated with, comprised of, contained within or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two or more components herein combined to achieve a particular functionality can be seen as "associated with" each other such that the desired functionality is achieved, irrespective of architectures or intermediate components. Likewise, any two or more components so associated can also be viewed as being "operably connected", or "operably coupled", to each other to achieve the desired functionality, and any two or more components capable of being so associated can also be viewed as being "operably couplable", to each other to achieve the desired functionality. Specific examples of operably couplable include, but are not limited to, physically mateable and/or physically interacting components, and/or wirelessly interactable and/or wirelessly interacting components, and/or logically interacting and/or logically interactable components.

Unless specifically stated otherwise or as apparent from the description herein, it is appreciated that throughout the present disclosure, discussions utilizing terms such as "accessing," "aggregating," "analyzing," "applying," "brokering," "calibrating," "checking," "combining," "communicating," "comparing," "conveying," "converting," "correlating," "creating," "defining," "deriving," "detecting," "disabling," "determining," "enabling," "estimating," "filtering," "finding," "generating," "identifying," "incorporating," "initiating," "locating," "modifying," "obtaining," "outputting," "predicting," "receiving," "reporting," "retrieving," "sending," "sensing," "storing," "transforming," "updating," "using," "validating," or the like, or other conjugation forms of these terms and like terms, refer to the actions and processes of a control unit, computer system or computing element (or portion thereof) such as, but not limited to, one or more or some combination of: a visual organizer system, a request generator, an Internet coupled computing device, a computer server, etc. In one example, the control unit, computer system and/or the computing element may manipulate and transform information and/or data represented as physical (electronic) quantities within the control unit, computer system's and/or computing element's processor(s), register(s), and/or memory(ies) into other data similarly represented as physical quantities within the control unit, computer system's and/or computing element's memory(ies), register(s) and/or other such information storage, processing, transmission, and/or display components of the computer system(s), computing element (s) and/or other electronic computing device(s). Under the direction of computer-readable instructions, the control unit, computer system(s) and/or computing element(s) may carry out operations of one or more of the processes, methods and/or functionalities of the present disclosure.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

It should also be noted that the different examples described herein can be combined in different ways. That is, parts of one or more examples can be combined with parts of one or more other examples. All of this is contemplated herein.

Example 1 is a method comprising:

identifying a crop stand with a constant density in a field;

harvesting the identified crop stand with a harvesting machine traveling at a first rate of advancement and a second rate of advancement;

measuring the throughput of the crop with a sensor interacting with the crop passing through the harvesting machine at a first rate of conveyance and a second rate of conveyance;

determining a correction value for the throughput measured with the sensor based on the throughputs of at least one of the first and second rate of advancement and the first and second rate of conveyance; and applying the correction value in subsequent measurements of the throughput by the sensor during the harvesting operation in the field.

Example 2 is the method of any or all previous examples and further comprising providing an electronic control device configured to receive a signal from the sensor.

Example 3 is the method of any or all previous examples and further comprising identifying the crop stand based on at least one of an input into an operator interface, a map stored in a memory of electronic control unit and a lookahead sensor.

Example 4 is the method of any or all previous examples and further comprising the sensor determining a volume throughput.

Example 5 is the method of any or all previous examples and further comprising converting the volume throughput into a mass throughput based on a density value.

Example 6 is the method of any or all previous examples and further comprising the harvesting machine is a forage harvester and the sensor determines the distance between precompacting rollers between which the crop is passed.

Example 7 is the method of any or all previous examples and further comprising storing the subsequent measurements of throughput in a geo-referenced manner.

Example 8 is the method of any or all previous examples and further comprising controlling a transfer operation from the harvesting machine using the subsequent measurements of throughput.

Example 9 is the method of any or all previous examples and further comprising controlling the adding of an ensiling agent using the subsequent measurements of throughput.

Example 10 is the method of any or all previous examples and further comprising the step of determining additional properties of the crop including at least one of a mass density and a moisture content.

Example 11 is an apparatus comprising:

a harvesting machine configured to operate at first and second rates of advancement;

a sensor associated with the harvesting machine and configured to measure throughput of the crop passing through the harvesting machine at first and second rates of conveyance; and an electronic control device configured to identify a crop stand with a constant density in a field and receive a signal from the sensor, the electronic control unit further determining a correction value for the throughput measured with the sensor based on at least one of the first and second rate of advancement and the first and second rate of conveyance and applying the correction value in subsequent measurements of the throughput by the sensor during operation of the harvesting machine in the field.

Example 12 is the apparatus of any or all previous examples and further comprising wherein the crop stand is provided by at least one of an input into an operator interface, a map stored in a memory of electronic control unit and a lookahead sensor.

Example 13 is the apparatus of any or all previous examples and further comprising the sensor is configured to determine the volume throughput.

Example 14 is the apparatus of any or all previous examples and further comprising the volume throughput is converted, using the electronic control device, into a mass throughput based on a density value.

Example 15 is the apparatus of any or all previous examples and further comprising the harvesting machine is a forage harvester and the sensor determines the distance between precompacting rollers between which the crop is passed.

Example 16 is the apparatus of any or all previous examples and further comprising the subsequent measurements of throughput are stored in memory of the electronic control device with geo-referenced information.

Example 17 is the apparatus of any or all previous examples and further comprising a transfer operation from the harvesting machine is controlled using the subsequent measurements of throughput.

Example 18 is the apparatus of any or all previous examples and further comprising an ensiling agent is added using the subsequent measurements of throughput.

Example 19 is the apparatus of any or all previous examples and further comprising wherein additional properties of the crop are determined, the additional properties including at least one of a mass density and a moisture content.

The invention claimed is:

1. A method comprising:
harvesting a first crop of a crop stand having a constant crop density in a field with a harvesting machine traveling at a first rate of advancement, wherein the first crop passes through the harvesting machine at a first rate of conveyance;
harvesting a second crop of the crop stand having the constant crop density with the harvesting machine at a second rate of advancement, wherein the second crop passes through the harvesting machine at a second rate of conveyance;
measuring, using a sensor, a throughput volume of the first and second crop as the first and second crop pass through the harvesting machine at the first rate of conveyance and the second rate of conveyance, respectively;
determining a correction value associated with the sensor based on a proportionality between: (a) a height measured by the sensor of the throughput volume and (b) the first and second rate of advancement and the first and second rate of conveyance; and
applying, during a harvesting operation in the field, the correction value in subsequent measurements of the throughput volume by the sensor.

2. The method of claim 1, further including providing an electronic control unit configured to receive a signal from the sensor.

3. The method of claim 2, further including identifying the crop stand based on at least one of an input into an operator interface, a map stored in a memory of the electronic control unit, or a lookahead sensor.

4. The method of claim 1, wherein measuring, using the sensor, the throughput volume of the first and second crop further includes determining the throughput volume of the first and second crop based on measuring, using the sensor, a first dimension and a second dimension of the throughput volume as the first and second crop pass through the harvesting machine at the first rate of conveyance and the second rate of conveyance, respectively.

5. The method of claim 4, further including converting the throughput volume into a mass throughput based on a density value.

6. The method of claim 4, wherein the harvesting machine is a forage harvester, and the measuring, using the sensor, of the first dimension and the second dimension includes that the sensor measures a distance between precompacting rollers, wherein the first and second crop pass through the harvesting machine between the precompacting rollers.

7. The method of claim 1, further including storing the subsequent measurements of the throughput volume in a geo-referenced manner.

8. The method of claim 7, further including controlling a transfer operation from the harvesting machine using the subsequent measurements of the throughput volume.

9. The method of claim 7, further including controlling adding of an ensiling agent using the subsequent measurements of the throughput volume.

10. The method of claim 1, further including determining additional properties of a crop of the crop stand including at least one of a mass density and a moisture content.

11. An apparatus comprising:
a harvesting machine configured to harvest a first crop and a second crop of a crop stand having a constant crop density in a field at a first and second rate of advancement, respectively;
a sensor associated with the harvesting machine and configured to measure a throughput volume of the first and second crop passing through the harvesting machine at a first and second rate of conveyance, respectively; and
an electronic control unit configured to:
determine a correction value associated with the sensor based on a proportionality between: (a) a height measured by the sensor of the throughput volume and (b) the first and second rate of advancement and the first and second rate of conveyance; and
applying apply, during operation of the harvesting machine in the field, the correction value in subsequent measurements of the throughput volume by the sensor.

12. The apparatus of claim 11, wherein the crop stand is provided by at least one of an input into an operator interface, a map stored in a memory of the electronic control unit, or a lookahead sensor.

13. The apparatus of claim 11, wherein the sensor is further configured to measure the throughput volume of the first and second crop based on a measurement, using the sensor, of a first dimension and a second dimension of the throughput volume as the first and second crop pass through the harvesting machine at the first rate of conveyance and the second rate of conveyance, respectively.

14. The apparatus of claim 13, wherein the electronic control unit is configured to convert the throughput volume into a mass throughput based on a density value.

15. The apparatus of claim 13, wherein the harvesting machine is a forage harvester, and to measure, using the sensor, the first dimension and the second dimension the sensor is further configured to measure a distance between precompacting rollers, wherein the first and second crop pass through the harvesting machine between the precompacting rollers.

16. The apparatus of claim 11, wherein the electronic control unit is configured to store the subsequent measurements of the throughput volume in memory of the electronic control unit with geo-referenced information.

17. The apparatus of claim 16, wherein the electronic control unit is configured to control a transfer operation from the harvesting machine using the subsequent measurements of the throughput volume.

18. The apparatus of claim 16, wherein an ensiling agent is added using the subsequent measurements of throughput.

19. The apparatus of claim 11, wherein the electronic control unit is configured to determine additional properties of a crop of the crop stand, the additional properties including at least one of a mass density and a moisture content.

20. At least one non-transitory computer-readable medium comprising machine-readable instructions to cause at least one processor circuit to at least:

cause harvesting of a first crop of a crop stand having a constant crop density in a field with a harvesting machine traveling at a first rate of advancement, wherein the first crop passes through the harvesting machine at a first rate of conveyance;

cause harvesting of a second crop of the crop stand having the constant crop density with the harvesting machine at a second rate of advancement, wherein the second crop passes through the harvesting machine at a second rate of conveyance;

measure, using a sensor, a throughput volume of the first and second crop as the first and second crop pass through the harvesting machine at the first rate of conveyance and the second rate of conveyance, respectively;

determine a correction value associated with the sensor based on a proportionality between: (a) a height measured by the sensor of the throughput volume and (b) the first and second rate of advancement and the first and second rate of conveyance; and apply, during a harvesting operation in the field, the correction value in subsequent measurements of the throughput volume by the sensor.

* * * * *